United States Patent [19]
Akita

[11] 3,891,914
[45] June 24, 1975

[54] POWER AND SIGNAL TRANSMITTING MEANS

[75] Inventor: Sigeyuki Akita, Kariya, Japan

[73] Assignee: Nippon Soken, Inc., Nishio-shi, Japan

[22] Filed: Apr. 19, 1973

[21] Appl. No.: 352,615

[30] Foreign Application Priority Data
Apr. 21, 1972  Japan.............................. 47-40792

[52] U.S. Cl. ...................... 321/47; 307/261; 321/2
[51] Int. Cl. ..................................... H02m 7/00
[58] Field of Search ........... 307/261, 297; 321/2, 47

[56] References Cited
UNITED STATES PATENTS

| | | | |
|---|---|---|---|
| 3,313,955 | 4/1967 | Brisay, Jr. .................... | 307/261 X |
| 3,417,311 | 12/1968 | Logan .................................. | 321/2 |
| 3,611,205 | 10/1971 | Ogawa .............................. | 321/2 X |

Primary Examiner—R. N. Envall, Jr.
Attorney, Agent, or Firm—Cushman, Darby & Cushman

[57] ABSTRACT

A power and signal transmitting means, in which a signal produced and supplied from a first circuit can be rectified to be taken out as supply power and can also be taken out in the form of a signal waveform from a second circuit, thereby eliminating leads for power transmission to individual circuits to simplify wiring work and reduce expenditure required for the wiring work and also reducing short-circuiting and contact failure accidents.

9 Claims, 6 Drawing Figures

POWER AND SIGNAL TRANSMITTING MEANS

BACKGROUND OF THE INVENTION

1. Field of the Invention

This invention relates to a power and signal transmitting means, which comprises first and second circuits constituted by electronic elements, the first circuit producing a signal supplied to the second circuit, the second circuit being capable of rectifying the supplied signal for the transmission of the rectified power and also reproducing the waveform of the supplied power for transmission.

2. Description of the Prior Art

For the transmission of signals among a plurality of independent electronic circuits, these electronic circuits have heretofore been rendered operative by supplying power to these circuits through respective power supply leads. Taking automobiles as an example, therefore, a number of lead wires are required for power transmission. This leads not only to increased expenditure required for automotive electric wiring but also to an increase of the bulk of electric wires, thus rendering the wiring difficult. Also, the possibility of resulting in accidental shortcircuit between lead and vehicle body is increased.

SUMMARY OF THE INVENTION

The invention seeks to overcome the above drawbacks, and it has for its object the provision of power source signal transmitting means, in which a signal produced and supplied from a first circuit can be rectified to be taken out as supply power and can also be taken out in the form of the signal waveform from a second circuit, thereby eliminating leads for power transmission to individual circuits to simplify the wiring operation and reduce expenditure required for wiring operation and also reducing short-circuit and contact failure accidents.

In one aspect of the invention, a D.C. power voltage conversion circuit for converting a supplied signal through rectification into a d-c voltage and a signal waveform pickup circuit to reproduce the supplied signal are provided, so that the prior art need for connecting power supply leads for operating electronic circuits can be eliminated to simplify wiring design and wiring operation, which is very beneficial as wiring means particularly in the light of the complicated wiring operations required to be carried out in a narrow space as in automobiles.

In a second aspect of the invention, a level converter to elevate the "O" level of a signal to be transmitted, a D.C. power voltage conversion circuit for converting a signal supplied from said level converter through rectification into a d-c voltage and a signal waveform pickup circuit to reproduce the waveform of said supplied signal are provided, whereby it is possible to obtain an excellent effect of rendering the output voltage of the power supply converter constant irrespective of fluctuation of the battery source voltage so as to preclude malfunctioning of the associated circuit.

DESCRIPTION OF THE PREFERRED EMBODIMENT

Figure 1:
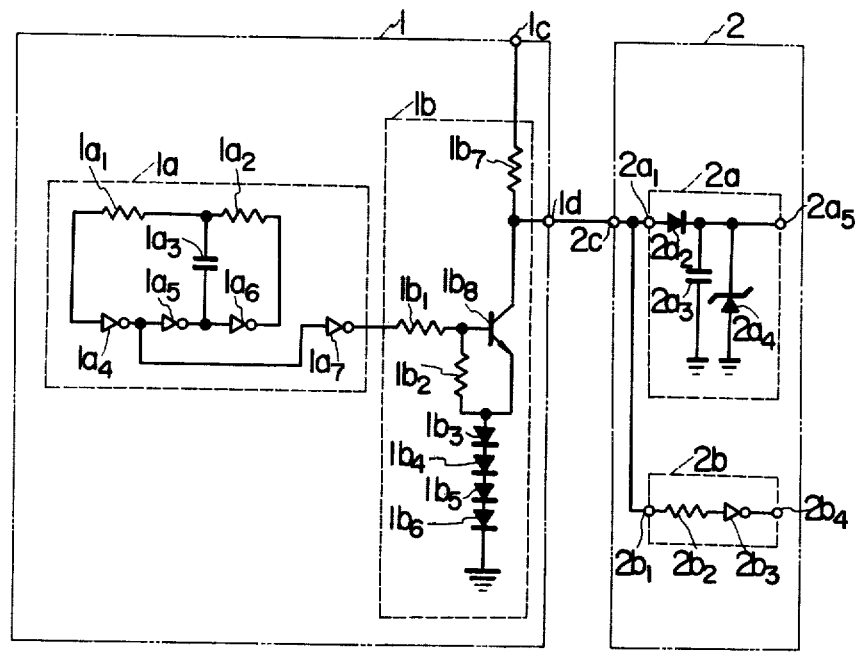
FIG. 1 is a circuit diagram showing an embodiment of the power and signal transmitting means according to the invention.
Figure 2A:
FIGS. 2A to 2E constitute a waveform chart showing voltage waveforms appearing at various parts of the embodiment of FIG. 1.
Figure 2B:
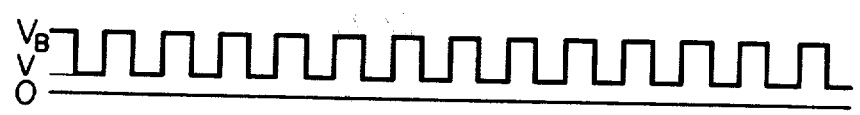
Figure 2C:
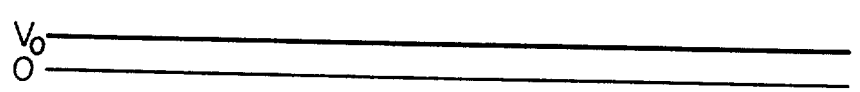

The invention will now be described in conjunction with the illustrated embodiment. Referring to FIG. 1, reference numeral 1 designates a first circuit which produces a signal. It includes an oscillator 1a oscillating at a constant frequency, for instance 16 kHz, to produce a pulse signal. The oscillator comprises two resistors $1a_1$ and $1a_2$, a capacitor $1a_3$, three inverters $1a_4$, $1a_5$ and $1a_6$ and an inverter $1a_7$ serving as waveform shaper. The output of the inverter $1a_7$ has a waveform as shown in FIG. 2A, and this waveform appears at a level converter 1b. The level converter 1a comprises three resistors $1b_1$, $1b_2$ and $1b_7$, four diodes $1b_3$, $1b_4$, $1b_5$ and $1b_6$ and a transistor $1b_8$. The signal of FIG. 2A goes through the resistor $1b_1$ to the base of the transistor $1b_8$. The potential on the emitter of the transistor $1b_8$ is elevated by the diodes $1b_3$, . . ., $1b_6$. As a result, a signal as shown in FIG. 2B appears at the collector of the transistor $1b_8$, i.e., a terminal $1d$. A terminal $1c$ is connected to the positive side of a battery (not shown). Numeral 2 designates a second circuit, which includes a D.C. power voltage conversion circuit for rectifying the input signal into d-c power supplied to electronic parts including inverter $2b_3$. The conversion circuit $2a$ comprises a diode $2a_2$, a capacitor $2a_3$ and a Zener diode $2a_4$. When input signal wave appears at its input terminal $2a_1$, it produces a constant-voltage output as shown in FIG. 2C appearing at its output terminal $2a_5$. The level converter 1b mentioned earlier is provided lest the voltage at the output terminal $2a_5$ of the conversion circuit $2a$ should fluctuate when the battery source level fluctuates. The output voltage of the conversion circuit 2a may be held constant by selecting the potential on the emitter of the transistor $1b_8$ such that there holds a relation.

$$\{(V_B + \Delta V_B) - V\}/2 + V > V_o,$$

with $V$ being emitter potential on the transistor $1b_8$ elevated by the diodes $1b_3$, . . ., $1b_6$ (as shown in FIG. 2B), $V_B$ being battery potential, and $\Delta V$ being change therein (provided the "on"-to-"off" ratio of the pulse signal is 1:1). In case of a signal wave as shown in FIG. 2E, the emitter potential on the transistor $1b_8$ need not be elevated if there holds a relation $$\{l_1/(l_1 + l_2)\} \cdot (V_B + \Delta V_B) > V_o$$

where $l_1$ is interval of "1" signal section and $l_2$ is interval of 0 signal section.

Figure 2D:
Figure 2E:
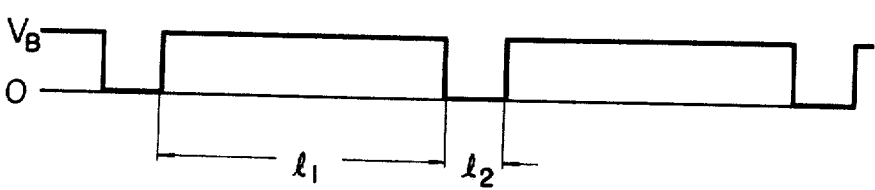

Reference symbol 2b in FIG. 1 designates a signal waveform pickout circuit, in which the signal waveform of FIG. 2B appearing at its input terminal $2b_1$ is coupled through a buffer resistor $2b_2$ to an inverter $2b_3$ of COS/-MOS design, thus giving rise to the appearance of a signal waveform as shown in FIG. 2D at an output terminal $2b_4$. The waveform of FIG. 2A can thus be reproduced.

The foregoing embodiment is by no means limitative, but various other forms of the invention are possible. For instance, the application of the invention is by no means limited to automobiles. Also, while in the above embodiment the signal to be rectified is produced from the oscillator 1a, a signal from any other signal generator, for instance a signal from a lead switch, an alternator or a distributor, may be used as well.

I claim:

1. A power and signal transmitting means including a first circuit for sending out a transmitted signal of a given repetition frequency over a transmission line and a second circuit means connected to said first circuit through said transmission line for receiving the signal transmitted over said transmission line for reproducing said transmitted signal, said second circuit comprising a D.C. power voltage conversion circuit for rectifying said transmitted signal to produce a D.C. power voltage and a signal wave pickup circuit for receiving said transmitted signal to reproduce said transmitting signal.

2. A power and signal transmitting means according to claim 1 wherein said first circuit includes an oscillator oscillating at a given repetition frequency.

3. A power and signal transmitting means according to claim 1 wherein said first circuit includes signal generating means for generating a signal and conversion means for converting the average voltage of said signal generated by said signal generating means to a higher voltage, to thereby provide said transmitted signal.

4. A power and signal transmitting means according to claim 3 wherein said signal generating means comprises an oscillator oscillating at a given repetition frequency.

5. A power and signal transmitting means according to claim 3 wherein said conversion means comprises a level conversion circuit for raising the 0 level potential of said signal generated by said signal generating means.

6. A power and signal transmitting means according to claim 4 wherein said conversion means comprises a level conversion circuit for raising the 0 level potential of said transmitted signal including the oscillation pulse signals generated by said oscillator.

7. A power and signal transmitting means according to claim 1 wherein said signal wave pickup circuit comprises an inverter gate fed with D.C. operating power voltage from said D.C. power voltage conversion circuit.

8. A power and signal transmitting means according to claim 2 wherein said signal wave pickup circuit comprises an inverter gate fed with D.C. operating power voltage from said D.C. power voltage conversion circuit.

9. A power and signal transmitting means according to claim 3 wherein said signal wave pickup circuit comprises an inverter gate fed with D.C. operating power voltage from said D.C. power voltage conversion circuit.

* * * * *